United States Patent
Gu et al.

(10) Patent No.: US 11,325,861 B1
(45) Date of Patent: May 10, 2022

(54) MULTI-SOLID WASTE ACTIVATED CONCRETE WITH HIGH-SILICON IRON ORE TAILINGS AND PREPARATION METHOD THEREOF

(71) Applicant: Northeastern University, Shenyang (CN)

(72) Inventors: Xiaowei Gu, Shenyang (CN); Weifeng Zhang, Shenyang (CN); Hao Wang, Shenyang (CN); Xiaohui Li, Shenyang (CN)

(73) Assignee: Northeastern University, Shenyang (CN)

( * ) Notice: Subject to any disclaimer, the term of this patent is extended or adjusted under 35 U.S.C. 154(b) by 0 days.

(21) Appl. No.: 17/568,245

(22) Filed: Jan. 4, 2022

(30) Foreign Application Priority Data

Jan. 7, 2021 (CN) .......................... 2021100185226

(51) Int. Cl.
| | |
|---|---|
| C04B 12/04 | (2006.01) |
| C04B 24/04 | (2006.01) |
| C04B 18/04 | (2006.01) |
| C04B 18/08 | (2006.01) |

(52) U.S. Cl.
CPC .......... C04B 12/04 (2013.01); C04B 18/0427 (2013.01); C04B 18/08 (2013.01); C04B 24/04 (2013.01)

(58) Field of Classification Search
CPC ..... C04B 12/04; C04B 18/0427; C04B 18/08; C04B 24/04
See application file for complete search history.

(56) References Cited

FOREIGN PATENT DOCUMENTS

| CN | 104310920 A | 1/2015 |
|---|---|---|
| CN | 111205038 A | 5/2020 |

OTHER PUBLICATIONS

First Office Action dated Apr. 14, 2021, issued in connection with Chinese Application No. 202110018226.4.
Second Office Action dated Jun. 2, 2021, issued in connection with Chinese Application No. 202110018226.4.
Third Office Action dated Jul. 29, 2021, issued in connection with Chinese Application No. 202110018226.4.

*Primary Examiner* — Anthony J Green
(74) *Attorney, Agent, or Firm* — Cook Alex Ltd.

(57) ABSTRACT

Multi-solid waste activated concretes with high-silicon iron ore tailings and preparation methods thereof are disclosed. In at least some embodiments, the concrete is prepared from raw materials including 360-380 kg/m$^3$ of a cement, 30-40 kg/m$^3$ of fly ash, 30-40 kg/m$^3$ of a modified ultrafine sand of high-silicon iron ore tailings, 930-950 kg/m$^3$ of a waste stone of tailings, 870-930 kg/m$^3$ of a fine sand of tailings, 160-170 kg/m$^3$ of water, and 4-8 kg/m$^3$ of an additive.

17 Claims, No Drawings

MULTI-SOLID WASTE ACTIVATED CONCRETE WITH HIGH-SILICON IRON ORE TAILINGS AND PREPARATION METHOD THEREOF

CROSS-REFERENCE TO RELATED APPLICATIONS

This application claims the benefit and priority of Chinese Patent Application No. 202110018226.4 filed on Jan. 7, 2021. The '226.4 application is incorporated by reference herein in its entirety.

FIELD OF THE INVENTION

The present disclosure relates to solid waste recycling, and particularly relates to a multi-solid waste activated concretes with high-silicon iron ore tailings and preparation methods thereof.

There is a gap between the high volume application of large amounts of industrial solid waste in concrete in China and the existing research level in foreign countries. In the 1990s fly ash was gradually applied to the concrete as an admixture, which starts large-scale application of a large amount of industrial solid waste in a ready-mixed concrete. At the beginning of this century, granulated blast furnace slag and steel slag were gradually applied in batch in the ready-mixed concrete as admixtures. In 2014, 'Technical Specification for Application of Iron Tailing Aggregate Concrete" was officially implemented, which promoted the batch application of the iron tailing in the concrete.

Currently, the industrial solid waste in China has an annual output of about 3.3 billion tons, and a historical accumulated stock exceeding 60 billion tons, with a footprint of over 2 million hectares. The massive stockpiling of waste stone of tailings and the violent exploitation of high-quality natural resources (such as sand and gravel) have caused serious ecological damage and environmental pollution risks. Combined with the large demand of raw materials of concrete and for the purpose of the quantity reduction, resource utilization and hazard-free treatment of bulk industrial solid wastes, the "industrial solid wastes" are converted into "renewable resources" by fine pretreatment of solid waste sources, which promotes the multi-channel scaled disposal of bulk industrial solid wastes and relieves the pressure of environmental protection.

SUMMARY OF THE INVENTION

Aiming at overcoming the defects of the prior art, the present disclosure provides multi-solid waste activated concretes with high-silicon iron ore tailings. In at least some embodiments, the concretes have high total solid waste admixing amounts, low cement consumptions, ideal concrete impermeabilities, high later compressive strengths and good fluidities of concrete mixture. The present application also provides for preparation methods of said concretes.

In order to solve the aforementioned technical problems, the present disclosure provides, in at least some embodiments, a multi-solid waste activated concrete with high-silicon iron ore tailings, which is prepared from raw materials including 360-380 kg/m³ of a cement, 30-40 kg/m³ of fly ash, 30-40 kg/m³ of a modified ultrafine sand of high-silicon iron ore tailings, 930-950 kg/m³ of a waste stone of tailings, 870-930 kg/m³ of a fine sand of tailings, 160-170 kg/m³ of water, and 4-8 kg/m³ of an additive.

In some embodiments, the cement is P.O42.5 ordinary silicate cement.

In some embodiments, the fly ash is class F, grade I fly ash, which has a 45 μm screen residue of 8.5-9%, a water demand ratio of 87%-90%, a loss on ignition of 0.78-1.21%, a water content of 0.12-0.52%, a sulfur trioxide content of 0.21-0.51%, a density of 2.15-2.25 g/cm³, invariability of 0.3-0.5 mm, a 28-day activity index of 76-80%, and an ammonium ion content of 105-107 ppm.

In some embodiments, a mass fraction of silicon dioxide in the modified ultrafine sand of high-silicon iron ore tailings is in the range of 70-80%.

In some embodiments, the modified ultrafine sand of high-silicon iron ore tailings is prepared by a process including screening an ultrafine sand of high-silicon iron ore tailings by using a 200-mesh screen;

mechanically activating by using an XQM-8 vertical planetary ball mill at an interval of forward and reverse rotation of 10-15 minutes and a rotating speed of 380-395 r/min for two hours; and cooling to room temperature.

In some embodiments, the waste stone of tailings is of 5-20 mm continuous grading, wherein the waste stone of tailings has an apparent density of 2,630-2,650 kg/m³, a bulk density of 1,490-1,520 kg/m³, a bulk density porosity of 40-43%, a silt content of 0.2-0.3%, a content of flat and elongated particles of 2.8-3%, and a strength crushing index of 7-7.4%.

In some embodiments, the fine sand of tailings has a fineness modulus of 2.1-2.2, an apparent density of 2,580-2,590 kg/m³, a bulk density of 1,530-1,540 kg/m³, a void ratio of 40-41%, a silt content of 2.1-2.4%, and a clay lump content of 0.6-0.8%.

In some embodiments, the additive includes a water reducing agent, a cellulose ether and dextrin, wherein the water reducing agent is a polycarboxylic acid water reducing agent with a water reducing rate of 34-36%, a bleeding rate of 43-45%, and a gas content of 3.0-3.2%. In some embodiments, the cellulose ether is present in an amount of 1.4-1.5‰ of the mass of the water reducing agent. In some embodiments, the dextrin is present in an amount of 1.4-1.5% of the mass of the water reducing agent.

Disclosed are methods for preparing the multi-solid waste activated concrete with high-silicon iron ore tailings as described above. In some embodiments, the methods include the following steps:

(a) drying the raw materials in an environment of 25-35° C. for 15-30 hours, respectively;

(b) synchronously stirring and mixing the cement, the fly ash and the modified ultrafine sand of high-silicon iron ore tailings obtained in step (a) at a speed of 48 r/min for 2-3 minutes;

(c) pouring the waste stone of tailings and the fine sand of tailings obtained in step (a) into a mixture obtained in step (b), and synchronously stirring the resulting mixture at a speed of 48 r/min for 2-3 minutes;

(d) adding 50% by mass of water to the resulting mixture obtained in step (c), and stirring at a speed of 48 r/min for 1-2 minutes to obtain a mixed slurry;

(e) adding an additive and a remaining 50% by mass of water into the mixed slurry obtained in step (d), stirring at a speed of 48 r/min for 1-2 minutes, and leaving the resultant slurry to stand for 1-2 min; and (f) pouring the slurry obtained in step (e) into a mold, vibrating on a vibratory table for 1-2 minutes, covering a surface of the slurry with a plastic preservative film, then pre-curing at a temperature of not lower than 18° C. but not higher than 22° C. for 2-3 h, curing with a programmed temperature rising and falling until demolding, and curing in a standard curing chamber to a corresponding curing age.

In some embodiments, in step (f), curing with the programmed temperature rising and falling comprises:

heating to 50-60° C. at a rate of 10° C./h within 4-5 hours and maintaining at 50-60° C. and curing for 10-12 h;

cooling to 20° C. at a rate of 10° C./h within 4-5 h; and finally curing at a temperature of not lower than 18° C. but not higher than 22° C. for 2-3 h.

In at least some embodiments, through the fine pretreatment of various solid waste sources, optimal, or at least improved, selection of aggregates, and application of a multi-element compounded chemical additive, the total solid waste admixing amount reaches 78-80%, which could effectively solve the problems of the huge accumulation, the low utilization rate and the inability of large-scale disposal of bulk industrial solid wastes. In the present disclosure, the waste stone of tailings after fine pretreatment is used as coarse and fine aggregates, so that the coarse and fine aggregates in the concrete are completely replaced, with a replacement rate of solid waste aggregate reaching 75-77%.

First, as for the aggregate, in at least some embodiments, the waste stone of tailings after fine pretreatment is used as coarse and fine aggregates, so that the coarse and fine aggregates in the concrete are completely replaced, with a replacement rate of solid waste aggregate reaching 75-77%.

In at least some embodiments, fine pretreatment of the coarse aggregate includes strict and optimal, or at least improved, selection of particle shape and grade and each gradation interval of the coarse aggregate, and the coarse aggregate size is continuously graded in the range of 5-20 mm.

When the particle size of the stone is larger, the specific surface area is smaller, and the required amount of cement slurry is less. Given certain workability and cement consumption, water consumption is less and it thereby results in an improved concrete strength. However, it does not mean that larger particle size is better, and the reasons are as follows: first a larger particle size brings out an increased probability of defects existing in the particles; second, a larger particle size makes particles sink faster during the mixing of the concrete, and results in uneven distribution of particles in the concrete, thereby reducing the strength of the hardened concrete.

When the particle size of the stone is smaller, the specific surface area is larger, and the void ratio is higher, so it results in increased cement consumption and thereby increased cost, otherwise it effects the strength of the concrete. Meanwhile, when the particle size of the stone is smaller, more dust adheres to the surface of the stone, which brings difficulties to the construction washing. Once the washing is unclean, the cohesive force of the aggregate interface is greatly weakened, and thereby the strength of the concrete is reduced. Therefore, in at least some embodiments of the present disclosure, the gradation proportion of each part of the coarse aggregate is strictly and optimally controlled.

As for the particle shape of the coarse aggregate, pebbles have a smooth surface, few edges and corners, a small gap and a small specific surface area. Also, the coarse aggregate requires less cement consumption during the mixing of the concrete, exhibits good workability, but poor cohesive force with the cement slurry. While crushed stone particles are rough and have edges and corners, large voids, large specific surface area, and large water demands, they exhibit strong cohesive force with the cement slurry.

In the present disclosure, the characteristics of roughness, multiple edges, and corners of the surface of the waste stone of tailings (which is stripped from an open-pit mine) after fine pretreatment allow for a stronger cohesive force at the interface between the aggregate and the cement slurry. Although the multiple edges and corners increase the specific surface area of the stone and thereby increase the water demand, this problem is effectively solved by adding multi-element compounded chemical additive(s), which finally ensures good working capability of the concrete, while improving its strength.

In at least some embodiments, fine pretreatment of the fine aggregate includes a strict powder collection and a powder control after crushing to ensure that the resultant fine sand of tailings does not affect the overall performance of the concrete by being too fine. In at least some embodiments, the fine aggregate has a fineness modulus of 2.1-2.2, and a sand ratio of 46-48%. With sand ratio as defined above, the filling and wrapping effect of the mortar improves the friction among the coarse aggregates, and the fluidity of the concrete mixture is good. Meanwhile, the cohesiveness and water retention of the mixture are improved.

In at least some embodiments, the ultrafine sand of high-silicon iron ore tailings discharged from an ore dressing plant to a tailing pond is modified by mechanical activation, and then applied together with the fly ash as an admixture to the concrete, thereby reducing the cement consumption, saving cost, and improving the impermeability and later compressive strength of the concrete.

In at least some embodiments, the waste stone of tailings (the coarse aggregate) is obtained from fine pretreatment. In at least some embodiments, in the coarse aggregate there are fewer particles with higher weathering degree and fewer particles with an obvious bedding structure, so that the permeability of the coarse aggregate is low; meanwhile, the coarse aggregate has a small content of flat and elongated particles and is of good gradation, such that there is less free water and pores at the interface, and after water evaporation less pores are formed.

Furthermore, the incorporation of the fly ash and the modified sand of high-silicon iron ore tailings exerts the "micro-aggregate effect" and "pozzolanic activity" of the particles themselves, which further optimizes, or at least improves, the internal pores of the whole material. Furthermore, the incorporation of the mineral admixture reduces hydration heat, which thereby reduces the interface cracking caused by the high hydration heat. In view of the above, the optimization, or at least improvement, of gradation among aggregates and the proper use of mineral admixtures allows for significantly improved overall impermeability of the concrete.

Due to the large amount of inert silicon dioxide contained in the ultrafine sand of high-silicon iron ore tailings, partial sand particles of tailings after mechanical activation can exert their pozzolanic activity, participate in a secondary hydration reaction, consume calcium hydroxide enriched in an interfacial transition zone, and generate more calcium-silicate-hydrate (C—S—H), thereby making the transition zone more compact, cooperatively solve the problem of weak interfacial transition zone of the concrete, and improve the strength of the concrete.

In at least some embodiments, from the new multi-element compounded chemical additive, a high-efficiency additive for the concrete of the present disclosure is provided, which reduces the adverse effects on the concrete caused by the addition of the solid waste and achieves good working capability.

Compared with the prior art, the present disclosure has the following technical effects.

(1) Both coarse and fine aggregates are derived from the waste stone of tailings stripped from the open-pit mine, which have a high water demand due to their uneven particle size distribution, roughness, edges and corners, large voids and large specific surface area. In at least some embodiments, strict and optimal selection of the waste stone of tailings after the fine pretreatment insures that not only is its gradation continuous, but also the void ratio among the particles is reduced. Because of the low content of flat and elongated particles in the waste stone of tailings and the characteristics of roughness and multiple edges and corners of the particles, the cohesive force between the aggregate and the cement slurry is improved, thereby improving the strength. Meanwhile, by optimizing, or at least improving, the sand ratio, the total solid waste admixing amount in the concrete reaches 78-80%.

(2) In at least some embodiments, the desired modified ultrafine sand of high-silicon iron ore tailings is prepared by screening the ultrafine sand of high-silicon iron ore tailings by using a 0.075 mm (200-mesh) screen; mechanically activating by using an XQM-8 vertical planetary ball mill at an interval of forward and reverse rotation of 10-15 minutes and a rotating speed of 380-395 r/min for two hours; and cooling to room temperature. By means of the pozzolanic activity of partial particles after the mechanical activation of the ultrafine sand of high-silicon iron ore tailings, CH enriched in the interfacial transition zone is consumed, more C—S—H is generated, resulting in that the orientation degree and range of CH crystals are reduced, and that the thickness of the transition layer is reduced, which reduces the adverse interface effect and enables the transition layer tends to be more balanced. Meanwhile, inactive fine particles exert their "micro-aggregate effect" to micro-fill the interface pores, which makes the transition zone more compact, improves the problem of the weak interfacial transition zone of the concrete, and improves the strength of the concrete. The use of the ultrafine sand of high-silicon iron ore tailings not only reduces the cement consumption and saves costs, but also broadens the applications for a material with a high additional value prepared from the ultrafine sand of high-silicon iron ore tailings.

(3) From the new multi-element compounded chemical additive, a high-efficiency additive is provided, which effectively reduces the adverse effects on the concrete caused by the addition of the solid waste, achieves good working capability, and meets a strength standard. In least in part by reducing the water-cement ratio of the surface area of the aggregate, the new multi-element compounded chemical additive (the combined use of the water reducing agent, the cellulose ether and dextrin) enables the thickness of the water film on the surface of the aggregate to be thinner, allows for increased ion concentration, and effectively promotes the contact between C—S—H and the aggregate, thereby improving the cohesive ability of the interfacial zone and reducing the porosity.

DETAILED DESCRIPTION OF ILLUSTRATIVE EMBODIMENT(S)

In this present application, the term "ultrafine" in "modified ultrafine sand of high-silicon iron ore tailings", refers to a particle size of less than 0.075 mm In this present application, the term "fine" in "fine sand of tailings" refers to a particle size of 0.075-5 mm In this present application, the term "P.O42.5 ordinary silicate cement" refers to an ordinary silicate cement which is of a 42.5 strength level according to GB175-2007.

The present disclosure will be further described below with reference to specific examples. The claimed scope of the present disclosure is not limited to the following contents.

I. Composition of Raw Materials

In at least some embodiments, 360-380 kg/m$^3$ of a cement is used. In some embodiments, the cement is an ordinary silicate cement 42.5.

In at least some embodiments, 30-40 kg/m$^3$ of fly ash is used. In some embodiments, the fly ash is class F, grade I fly ash, which has a fineness (a 45 μm screen residue) of 8.5-9%, a water demand ratio of 87-90%, a loss on ignition of 0.78-1.21%, a water content of 0.12-0.52%, a sulfur trioxide content of 0.21-0.51%, a density of 2.15-2.25 g/cm$^3$, invariability of 0.3-0.5 mm, a 28-day activity index of 76-80%, and an ammonium ion content of 105-107 ppm.

In at least some embodiments, 30-40 kg/m$^3$ of a modified ultrafine sand of high-silicon iron ore tailings is used. In some embodiments, a mass fraction of internal silicon dioxide in the modified ultrafine sand of high-silicon iron ore tailings is in the range of 70-80%.

In at least some embodiments, the modified ultrafine sand of high-silicon iron ore tailings is prepared by a process as follows: ultrafine sand of high-silicon iron ore tailings is first screened by using a 200-mesh screen, and then mechanically activated by using an XQM-8 vertical planetary ball mill at an interval of forward and reverse rotation of 10-15 minutes and a rotating speed of 380-395 r/min for two hours; the resulting product is cooled to room temperature. Upon mechanical activation, the ultrafine sand of high-silicon iron ore tailings possess a pozzolanic activity, which consumes calcium hydroxide enriched in the interfacial transition zone and generates more C—S—H, thereby making the transition zone more compact, improving the problem of weak interfacial transition zone of the concrete, and improving the strength of the concrete. The chemical reaction is summarized according to the following equation: $Ca(OH)_2 + SiO_2 = CaSiO_3 + H_2O$.

In at least some embodiments, 930-950 kg/m$^3$ of a waste stone of tailings is used. In some embodiments, the waste stone of tailings is of 5-20 mm continuous grading, and has an apparent density of 2,630-2,650 kg/m$^3$, a bulk density of 1,490-1,520 kg/m$^3$, a bulk density porosity of 40-43%, a silt content of 0.2-0.3%, a content of flat and elongated particles of 2.8-3%, and a strength crushing index of 7-7.4%.

In at least some embodiments, 870-930 kg/m$^3$ of a fine sand of tailings is used. In some embodiments, the fine sand of tailings has a fineness modulus of 2.1-2.2, an apparent density of 2,580-2,590 kg/m$^3$, a bulk density of 1,530-1,540 kg/m$^3$, a void ratio of 40-41%, a silt content of 2.1-2.4%, and a clay lump content of 0.6-0.8%.

In at least some embodiments, 160-170 kg/m$^3$ of water is used. In some embodiments, tap water is used.

In at least some embodiments, an additive is used. In some embodiments, 4-8 kg/m$^3$ of a polycarboxylic acid water reducing agent is used as the water reducing agent, which has a water reducing rate of 34-36%, a bleeding rate of 43-45%, and an air content of 3.0-3.2%, and a cellulose ether and dextrin are added together with the water reducing agent, wherein the cellulose ether is used in an amount of 1.4-1.5% of the mass of the water reducing agent; dextrin is used in an amount of 1.4-1.5% of the mass of the water reducing agent.

In at least some embodiments, the fly ash and the ultrafine sand of high-silicon iron ore tailings are used as a solid waste admixture to replace part of the cement, which account for 3-5% of the total mass of the concrete. In some embodiments, the fine aggregate is used as the fine sand of tailings, which accounts for 38-40% of the total mass of the concrete. In some embodiments, the coarse aggregate is used as the waste stone of tailings, which accounts for 36-38% of the total mass of the concrete. In at least some embodiments, the solid waste accounts for 78-80% of the total mass of the concrete.

II. Preparation Methods

1. The required raw materials are weighed in proportion, and put into a blast air oven at 30° C. and dried for 24 hours.

2. The dried cement, dried fly ash and dried modified ultrafine sand of high-silicon iron ore tailings are put into an agitator synchronously, and the residual particles on the weighing tray are brushed into the agitator kettle with a wool brush. They are then stirred at a constant speed of 48 r/min for 2-3 minutes.

3. The dried waste stone of tailings and the dried fine sand of tailings are put into the agitator synchronously, the residual particles on the weighing tray are brushed into the agitator kettle with a wool brush, and then they are stirred again at a constant speed of 48 r/min for 2-3 minutes, so that the aggregate and the cementing material are fully and uniformly mixed.

4. 50% by mass of water is added to the resultant mixed material and they are stirred at a constant speed of 48 r/min for 1-2 minutes to obtain a uniformly mixed slurry. The uniformly mixed slurry is left to stand for 30 s, and the residual material on the inner wall of the agitator is scraped into the agitator kettle.

5. An additive and the remaining 50% by mass of water are added to the uniformly mixed slurry, and they are stirred at a constant speed of 48 r/min for 1-2 minutes, and finally the resultant slurry is left to stand for 1 min.

6. The resultant slurry is poured into a mold and vibrated on a vibratory table for 1-2 minutes. The slurry is covered with a plastic preservative film on its surface. It is then pre-cured at a temperature of 20±2° C. for 2-3 h, then cured with a programmed temperature rising and falling (heating to 50-60° C. at a rate of 10° C./h within 4-5 hours and maintaining at 50-60° C. and curing for 10-12 h; cooling to 20° C. at a rate of 10° C./h within 4-5 h; finally curing at a temperature of 20±2° C. for 2-3 h until demolding), and subsequently cured in a standard curing chamber to a corresponding curing age.

Example 1

A multi-solid waste activated concrete with high-silicon iron ore tailings was prepared.

Raw materials used were as follows: 380 kg/m³ of P.O42.5 ordinary silicate cement, 40 kg/m³ of class F, grade I fly ash, 30 kg/m³ of a modified ultrafine sand of high-silicon iron ore tailings, 945 kg/m³ of a waste stone of tailings (which was of 5-20 mm continuous grading), 875 kg/m³ of a fine sand of tailings, 165 kg/m³ of water, and an additive (which consisted of a high-performance polycarboxylic acid water reducing agent, a cellulose ether and dextrin, wherein 5 kg/m³ of the high-performance polycarboxylic acid water reducing agent was used, the cellulose ether was used in an amount of 1.5‰ of the mass of the water reducing agent, and dextrin was used in an amount of 1.5% of the mass of the water reducing agent).

The modified ultrafine sand of high-silicon iron ore tailings was prepared according to the following procedures: an ultrafine sand of high-silicon iron ore tailings was screened by using a 200-mesh screen, then mechanically activated by using a XQM-8 vertical planetary ball mill at an interval of forward and reverse rotation of 12 minutes and a rotating speed of 385 r/min for two hours, and then cooled to room temperature.

Preparation Method:

1. The required raw materials were weighed in proportion, and put into a blast air oven at 30° C. and dried for 24 hours.

2. The dried cement, dried fly ash and dried modified ultrafine sand of high-silicon iron ore tailings were put into an agitator synchronously, and the residual particles on the weighing tray were brushed into the agitator kettle with a wool brush. They were then stirred at a constant speed of 48 r/min for 2.5 minutes.

3. The dried waste stone of tailings and the dried fine sand of tailings were put into the agitator synchronously, the residual particles on the weighing tray were brushed into the agitator kettle with a wool brush, and they were then stirred again at a constant speed of 48 r/min for 2.5 minutes, so that the aggregate and the cementing material were fully and uniformly mixed.

4. 50% by mass of water was added to the resultant mixed material and they were stirred at a constant speed of 48/min for 1.5 minutes, obtaining a uniformly mixed slurry. The uniformly mixed slurry was left to stand for 30 s, and the residual material on the inner wall of the agitator was scraped into the agitator kettle.

5. An additive and the remaining 50% by mass of water were added to the uniformly mixed slurry, and they were stirred at a constant speed of 48 r/min for 1.5 minutes, and finally the resultant slurry was left to stand for 1 min.

6. The resultant slurry was poured into a mold and vibrated on a vibratory table for 1.5 minutes. The slurry was covered with a plastic preservative film on its surface. It was then pre-cured at a temperature of 20° C. for 2.5 h, then cured with a programmed temperature rising and falling (heating to 55° C. at a heating rate of 10° C./h within 4.5 h, maintaining at 55° C. and curing for 11 h, and cooling to 20° C. at a rate of 10° C./h within 4.5 h, and finally curing at 20° C. for 2.5 h until demolding), and subsequently cured in a standard curing chamber to a corresponding curing age.

The prepared target product, i.e., the multi-solid waste activated concrete with high-silicon iron ore tailings, had a 7-day compressive strength of 36.1 MPa and a 28-day compressive strength of 41.7 MPa; a 56-day chloride-ion diffusion coefficient of $2.3 \times 10^{-12}$ m$^2$/S, a 56-day chloride-ion dielectric flux of 1,840 C, a cylinder-splitting tensile strength of 3.0 MPa, a porosity of 20%, an elastic modulus of 25, a water absorption of 5%, freeze-thaw resistance of 20% durable, and an air content of 4%.

Example 2

Raw materials used were as follows: 360 kg/m³ of a cement, 30 kg/m³ of fly ash, 30 kg/m³ of a modified ultrafine sand of high-silicon iron ore tailings, 930 kg/m³ of a waste stone of tailings (which was of 5-20 mm continuous grading), 930 kg/m³ of a fine sand of tailings, 160 kg/m³ of water, and an additive (in which 7.5 kg/m³ of a high-performance polycarboxylic acid water reducing agent was used, the cellulose ether was used in an amount of 1.5‰ of the mass of the water reducing agent, and dextrin was used in an amount of 1.5% of the mass of the water reducing agent).

The preparation method was the same as that of Example 1.

The prepared target product had a 7-day compressive strength of 35.4 MPa, and a 28-day compressive strength of 38.6 MPa, a 56-day chloride-ion diffusion coefficient of $2.7\times10^{-12}$ m$^2$/s, a 56-day chloride-ion dielectric flux of 1890 C, a cylinder-splitting tensile strength of 2.9 MPa, a porosity of 21%, an elastic modulus of 24, a water absorption of 6%, freeze-thaw resistance of 19% durable, and an air content of 5%.

Example 3

Raw materials used were as follows: 380 kg/m$^3$ of a cement, 40 kg/m$^3$ of fly ash, 30 kg/m$^3$ of a modified ultrafine sand of high-silicon iron ore tailings, 930 kg/m$^3$ of a waste stone of tailings (which was of 5-20 mm continuous grading), 890 kg/m$^3$ of a fine sand of tailings, 165 kg/m$^3$ of water, and an additive (in which 4.6 kg/m$^3$ of a high-performance polycarboxylic acid water reducing agent was used, the cellulose ether was used in an amount of 1.5%0 of the mass of water reducing agent, and the dextrin was used in an amount of 1.5% of the mass of water reducing agent).

The preparation method was the same as that of Example 1.

The prepared target product had a 7-day compressive strength of 34.2 MPa, and a 28-day compressive strength of 37.9 MPa, a 56-day chloride-ion diffusion coefficient of $2.9\times10^{-12}$ m$^2$/s, a 56-day chloride-ion dielectric flux of 1,930 C, a cylinder-splitting tensile strength of 2.8 MPa, a porosity of 22%, an elastic modulus of 23, a water absorption of 7%, a freeze-thaw resistance of 18% durable, and an air content of 6%.

In Examples 1-3, the modified ultrafine sand of high-silicon iron ore tailings used were prepared according to the following procedures: ultrafine sand of high-silicon iron ore tailings was screened by using a 200-mesh screen, then mechanically activated by using an XQM-8 vertical planetary ball mill at an interval of forward and reverse rotation of 10-15 minutes and a rotating speed of 380-395 r/min for two hours, and then cooled to room temperature.

Comparative Example (Current Concrete)

Raw materials used were as follows: 360 kg/m$^3$ of a cement; 40 kg/m$^3$ of fly ash; 990 kg/m$^3$ of a coarse aggregate (which was of 5-16 mm continuous grading), 880 kg/m$^3$ of a natural river sand; 155 kg/m$^3$ of water; and 6 kg/m$^3$ of a high-performance polycarboxylic acid water reducing agent.

The preparation method was performed according to a general method.

The prepared product had a 7-day compressive strength of 31.2 MPa, a 28-day compressive strength of 36.9 MPa, a 56-day chloride-ion diffusion coefficient of $2.9\times10^{-12}$ m$^2$/S, a 56-day chloride-ion dielectric flux of 1,960 C; a cylinder-splitting tensile strength of 2.6 MPa, a porosity of 24%, an elastic modulus of 18, a water absorption of 9%, a freeze-thaw resistance of 11% durable, and an air content of 8%.

During the preparation of the multi-solid waste concrete according to the present disclosure, the advantages of the solid wastes are utilized, and they are combined into the concrete, so that the prepared multi-solid waste concrete exhibits both better mechanical performance and better durability than current concretes (see the Comparative Example above). It is achieved by the following specific technical means:

1) As for the coarse aggregate: when the particle size of the stone is larger, the specific surface area is smaller, and the required amount of cement slurry is less. Given certain workability and cement consumption, water consumption is less and it thereby results in an improved concrete strength. However, it does not mean that larger particle size is better, and the reasons are as follows: first a larger particle size brings out an increased probability of defects existing in the particles; second, a larger particle size makes particles sink faster during the mixing of the concrete, and results in uneven distribution of particles in the concrete, thereby reducing the strength of the hardened concrete. When the particle size of the stone is smaller, the specific surface area is larger, and the void ratio is higher, so it inevitably results in increased cement consumption and thereby increased cost, otherwise it affects the strength of the concrete. Meanwhile, when the particle size of the stone is smaller, more dust is adhered to the surface of the stone, which brings difficulties to the construction washing. Once the washing is unclean, the cohesive force of the aggregate interface is greatly weakened, and thereby the strength of the concrete is reduced. Therefore, in the present disclosure, the gradation proportion of each part of the coarse aggregate is strictly and optimally controlled, thereby providing the waste stone of tailings coarse aggregate with continuous grading in the particle size range of 5-20 mm In the present disclosure, the characteristics of roughness and multiple edges and corners of the surface of the waste stone of tailings (which is stripped from an open-pit mine) after fine pretreatment allow for a stronger cohesive force at the interface between the aggregate and the cement slurry. Although the multiple edges and corners increase the specific surface area of the stone and thereby increase the water demand, this problem is effectively solved by adding new multi-element compounded chemical additive(s) in the present disclosure, which finally ensures good working capability of the concrete and improved strength.

2) As for the fine aggregate: a fine pretreatment of the fine aggregate includes a strict powder collection and a powder control after the preparation of the fine aggregate to ensure that the resultant fine sand of tailings does not affect the overall performance of the concrete by being too fine. The fine aggregate has a fineness modulus of 2.1-2.2, and a sand ratio of 46-48%. With a sand ratio as defined above, the filling and wrapping effect of the mortar improves the friction among the coarse aggregates, and the fluidity of the concrete mixture is good. Meanwhile, the cohesive force and water retention of the mixture are improved, so that the internal compactness and uniformity of the concrete are improved, and the mechanical performance and durability of the concrete are improved.

3) As for the mineral admixture: in the present disclosure, the ultrafine sand of high-silicon iron ore tailings discharged from an ore dressing plant to a tailing pond is modified by mechanical activation, and then applied together with the fly ash as a mixture to the concrete, thereby reducing the cement consumption, saving cost and improving the impermeability and later compressive strength of the concrete.

In the present disclosure, the waste stone of tailings (the coarse aggregate) is obtained from fine pretreatment, and in the coarse aggregate there are fewer particles with higher weathering degree and fewer particles with an obvious bedding structure, so that the permeability of the coarse aggregate is low; meanwhile, the coarse aggregate has a small content of flat and elongated particles and is of good gradation, such that there is less free water and pores at the interface, and after water evaporation less pores are formed.

Furthermore, the incorporation of the fly ash and the modified high-silicon iron ore tailings sand exerts the "micro-aggregate effect" and "pozzolanic activity" of the particles themselves, which further optimizes the internal pores of the whole material. By means of the pozzolanic activity of partial particles after the mechanical activation of the ultra-fine sand of high-silicon iron ore tailings, CH enriched in the interfacial transition zone is consumed, more C—S—H is generated, resulting in that the orientation degree and range of CH crystals are reduced, and that the thickness of the transition layer is reduced, which reduces the adverse interface effect, and enables the transition layer tends to be more balanced. Meanwhile, inactive fine particles exert their "micro-aggregate effect" to micro-fill the interface pores, which makes the transition zone more compact, improves the problem of the weak interfacial transition zone of the concrete, and improves the strength and impermeability of the concrete. The incorporation of the mineral admixture reduces hydration heat, which thereby reduces interface cracking caused by the too high hydration heat. Furthermore, the new multi-element compounded chemical additive effectively improves the adverse effects on the concrete caused by the addition of the solid waste, achieves good working capability, and meets a strength standard. Mainly by reducing the water-cement ratio of the surface area of the aggregate, the new multi-element compounded chemical additive (the combined use of the water reducing agent, cellulose ether and dextrin) enables the thickness of the water film on the surface of the aggregate to be thinner, allows for increased the ion concentration, and effectively promotes the contact between C—S—H and the aggregate, thereby improving the cohesive ability of the interfacial zone and reducing the porosity. Therefore, the mechanical performance and durability of the concrete are improved.

In view of the above, the optimization, or at least improvement, of gradation among the aggregates, the "double action" of the modified high-silicon iron ore tailings sand, and the adjustment and improvement roles of the new multi-element chemical additive impart significantly improved mechanical performance and durability to the concrete than those of the concrete used in actual production.

The comparison of various performances between the concrete used in actual production and the multi-solid waste activated concrete is shown in the table below:

|  | Current Concrete (Prior Art) | Multi-solid waste Concrete |
|---|---|---|
| Compressive strength | 35-38 | 40-45 |
| Cylinder-splitting tensile strength | 2.5-2.7 | 2.8-3.0 |
| Maximum aggregate particle size (mm) | 5-16 | 5-20 |
| Porosity | 23-25% | 20-22% |
| Elasticity modulus | 16-20 | 23-25 |
| Water absorption | 8-10% | 5-7% |
| Freeze-thaw resistance | 10-12% durable | 18-20% durable |
| Air content | 7-8% | 4-6% |

For those skilled in the art, various modifications and variations could be made to the present disclosure. Any modifications, equivalent substitutions, improvements, etc. made within the spirit and scope of the present disclosure should fall within the claimed scope of the present disclosure.

What is claimed is:

1. A multi-solid waste activated concrete with high-silicon iron ore tailings, which is prepared from raw materials comprising
   360-380 kg/m$^3$ of a cement;
   30-40 kg/m$^3$ of fly ash;
   30-40 kg/m$^3$ of a modified ultrafine sand of high-silicon iron ore tailings;
   930-950 kg/m$^3$ of a waste stone of tailings;
   870-930 kg/m$^3$ of a fine sand of tailings;
   160-170 kg/m$^3$ of water; and
   4-8 kg/m$^3$ of an additive.

2. The multi-solid waste activated concrete with high-silicon iron ore tailings of claim 1, wherein the cement is P.O42.5 ordinary silicate cement.

3. The multi-solid waste activated concrete with high-silicon iron ore tailings of claim 1, wherein the fly ash is class F, grade I fly ash, which has a 45 μm screen residue of 8.5-9%, a water demand ratio of 87%-90%, a loss on ignition of 0.78-1.21%, a water content of 0.12-0.52%, a sulfur trioxide content of 0.21-0.51%, a density of 2.15-2.25 g/cm$^3$, invariability of 0.3-0.5 mm, a 28-day activity index of 76-80%, and an ammonium ion content of 105-107 ppm.

4. The multi-solid waste activated concrete with high-silicon iron ore tailings of claim 3, wherein a mass fraction of internal silicon dioxide in the modified ultrafine sand of high-silicon iron ore tailings is in a range of 70-80%.

5. The multi-solid waste activated concrete with high-silicon iron ore tailings of claim 4, wherein the modified ultrafine sand of high-silicon iron ore tailings is prepared by a process comprising
   screening an ultrafine sand of high-silicon iron ore tailings by using a 200-mesh screen;
   mechanically activating by using an XQM-8 vertical planetary ball mill at an interval of forward and reverse rotation of 10-15 minutes and a rotating speed of 380-395 r/min for two hours; and
   cooling to room temperature.

6. The multi-solid waste activated concrete with high-silicon iron ore tailings of claim 5, wherein the waste stone of tailings is of 5-20 mm continuous grading;
   the waste stone of tailings has an apparent density of 2,630-2,650 kg/m$^3$, a bulk density of 1,490-1,520 kg/m$^3$, a bulk density porosity of 40-43%, a silt content of 0.2-0.3%, a content of flat and elongated particles of 2.8-3%, and a strength crushing index of 7-7.4%.

7. The multi-solid waste activated concrete with high-silicon iron ore tailings of claim 6, wherein the fine sand of tailings has a fineness modulus of 2.1-2.2, an apparent density of 2,580-2,590 kg/m$^3$, a bulk density of 1,530-1,540 kg/m$^3$, a void ratio of 40-41%, a silt content of 2.1-2.4%, and a clay lump content of 0.6-0.8%.

8. The multi-solid waste activated concrete with high-silicon iron ore tailings of claim 7, wherein the additive comprises a water reducing agent, a cellulose ether and dextrin, wherein
   the water reducing agent is a polycarboxylic acid water reducing agent with a water reducing rate of 34-36%, a bleeding rate of 43-45%, and a gas content of 3.0-3.2%; the cellulose ether is present in an amount of 1.4-1.5‰ of the mass of the water reducing agent; and
   the dextrin is present in an amount of 1.4-1.5% of the mass of the water reducing agent.

9. A method for preparing the multi-solid waste activated concrete with high-silicon iron ore tailings of claim 1, comprising
(a) drying the raw materials in an environment of 25-35° C. for 15-30 hours respectively;
(b) synchronously stirring and mixing the cement, the fly ash and the modified ultrafine sand of high-silicon iron ore tailings obtained in step (a) at a speed of 48 r/min for 2-3 minutes;
(c) pouring the waste stone of tailings and the fine sand of tailings obtained in step (a) into a mixture obtained in step (b), and synchronously stirring a resulting mixture at a speed of 48 r/min for 2-3 minutes;
(d) adding 50% by mass of water to the resulting mixture obtained in step (c), and stirring at a speed of 48 r/min for 1-2 minutes to obtain a mixed slurry;
(e) adding an additive and a remaining 50% by mass of water into the mixed slurry obtained in step (d), stirring at a speed of 48 r/min for 1-2 minutes, and leaving a resultant slurry to stand for 1-2 min; and
(f) pouring the slurry obtained in step (e) into a mold, vibrating on a vibratory table for 1-2 minutes, covering a surface of the slurry with a plastic preservative film, pre-curing at a temperature of not lower than 18° C. but not higher than 22° C. for 2-3 h, curing with a programmed temperature rising and falling until demolding, and curing in a standard curing chamber to a corresponding curing age.

10. The method for preparing the multi-solid waste activated concrete with high-silicon iron ore tailings of claim 9, wherein in step (f), curing with the programmed temperature rising and falling comprises
heating to 50-60° C. at a rate of 10° C./h within 4-5 hours, and maintaining at 50-60° C. and curing for 10-12 h;
cooling to 20° C. at a rate of 10° C./h within 4-5 h; and
finally curing at a temperature of not lower than 18° C. but not higher than 22° C. for 2-3 h.

11. The method of claim 9, wherein the cement is P.O42.5 ordinary silicate cement.

12. The method of claim 9, wherein the fly ash is class F, grade I fly ash, which has a 45 μm screen residue of 8.5-9%, a water demand ratio of 87%-90%, a loss on ignition of 0.78-1.21%, a water content of 0.12-0.52%, a sulfur trioxide content of 0.21-0.51%, a density of 2.15-2.25 g/cm$^3$, invariability of 0.3-0.5 mm, a 28-day activity index of 76-80%, and an ammonium ion content of 105-107 ppm.

13. The method of claim 9, wherein a mass fraction of internal silicon dioxide in the modified ultrafine sand of high-silicon iron ore tailings is in a range of 70-80%.

14. The method of claim 9, wherein the modified ultrafine sand of high-silicon iron ore tailings is prepared by a process comprising
screening an ultrafine sand of high-silicon iron ore tailings by using a 200-mesh screen;
mechanically activating by using an XQM-8 vertical planetary ball mill at an interval of forward and reverse rotation of 10-15 minutes and a rotating speed of 380-395 r/min for two hours; and
cooling to room temperature.

15. The method of claim 9, wherein the waste stone of tailings is of 5-20 mm continuous grading;
the waste stone of tailings has an apparent density of 2,630-2,650 kg/m$^3$, a bulk density of 1,490-1,520 kg/m$^3$, a bulk density porosity of 40-43%, a silt content of 0.2-0.3%, a content of flat and elongated particles of 2.8-3%, and a strength crushing index of 7-7.4%.

16. The method of claim 9, wherein the fine sand of tailings has a fineness modulus of 2.1-2.2, an apparent density of 2,580-2,590 kg/m$^3$, a bulk density of 1,530-1,540 kg/m$^3$, a void ratio of 40-41%, a silt content of 2.1-2.4%, and a clay lump content of 0.6-0.8%.

17. The method of claim 9, wherein the additive comprises a water reducing agent, a cellulose ether and dextrin, wherein the water reducing agent is a polycarboxylic acid water reducing agent with a water reducing rate of 34-36%, a bleeding rate of 43-45%, and a gas content of 3.0-3.2%;
the cellulose ether is present in an amount of 1.4-1.5%0 of the mass of the water reducing agent; and
the dextrin is present in an amount of 1.4-1.5% of the mass of the water reducing agent.

* * * * *